US007143431B1

(12) United States Patent
Eager et al.

(10) Patent No.: US 7,143,431 B1
(45) Date of Patent: Nov. 28, 2006

(54) METHOD FOR REDUCED BANDWIDTH FOR ON-DEMAND DATA STREAMING USING MINI-CLUSTERS

(75) Inventors: Derek L. Eager, Saskatoon (CA); Mary K. Vernon, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 921 days.

(21) Appl. No.: 09/633,506

(22) Filed: Aug. 7, 2000

Related U.S. Application Data

(60) Provisional application No. 60/147,569, filed on Aug. 6, 1999.

(51) Int. Cl.
*H04N 7/173* (2006.01)
(52) U.S. Cl. ...................... 725/101; 709/231
(58) Field of Classification Search .................. 725/97, 725/95, 101, 87, 90, 89, 88, 102; 709/231, 709/232
See application file for complete search history.

(56) References Cited

U.S. PATENT DOCUMENTS 5,446,490 A * 8/1995 Blahut et al. .................. 725/97
5,936,659 A * 8/1999 Viswanathan et al. ...... 725/103

OTHER PUBLICATIONS

Jean-Paul Nussbaumer et al., "Networking Requirements for Interactive Video on Demand", Jun. 1995, IEEE vol. 13, No. 5.*
*Skyscraper Broadcasting: A New Broadcasting Scheme For Metropolitan Video-on-Demand Systems*, Kien A. Hua et al., SIGCOMM '97 Cannes, France.
*A Low Bandwidth Broadcasting Protocol for Video on Demand*, Jehan-Francois Paris et al., Int'l Conference on Computer Communication and Networks (ICCCN), Oct. 1998.
*Efficient Broadcasting Protocols for Video on Demand*, Jehan-Francois Paris et al., Proc. Mascots '98, Montreal, Jul. 1998.
*Efficient Schemes for Broadcasting Popular Videos*, Lixin Gao, et al.
*Metropolitan area video-on-demand service using pyramid broadcasting*, S. Viswanathan et al., Multimedia Systems (1996) 4: 197-208.
*Supplying Instantaneous Video-on-Demand Services Using Controlled Multicast*, Lixin Gao et al.
*Optimal Patching Schemes for Efficient Multimedia Streaming*, Subhabrata Sen et al.
*Dynamic batching policies for an on-demand video server*, Asit Dan et al., Multimedia Systems (1996) 4:112-121.
*On Optimal Batching Policies for Video-on-Demand Storage Servers*, Charu C. Aggarwal et al., IEEE Multimedia Computing & Systems Conf., Hiroshima, Japan, Jun. 1996.
*Group-Guaranteed Channel Capacity in Multimedia Storage Servers*, Athanassios K. Tsiolis et al., SIGMETRICS 1997 Conference.
*A Permutation-Based Pyramid Broadcasting Scheme for Video-on-Demand Systems*, Charu C. Aggarwal et al.

(Continued)

*Primary Examiner*—Chris Kelley
*Assistant Examiner*—James Sheleheda
(74) *Attorney, Agent, or Firm*—Boyle Fredrickson Newholm Stein & Gratz S.C.

(57) ABSTRACT

An improvement on dynamic skyscraper delivery of continuous media programs, such as video, divides the channels used for the delivery of the video into leading and trailing groups. A cluster defining on transmission of a program can then be broken into mini-clusters in the leading group which may be freely matched to full clusters in the lower group with loosened alignment requirements. This decoupling provides more efficient allocation of bandwidth to on-demand consumer requests and permits strategic opportunities to merge requests with concurrently allocated bandwidth for similar programs.

11 Claims, 3 Drawing Sheets

OTHER PUBLICATIONS

*Design and Analysis of Permutation-Based Pyramid Broadcasting*, Charu C. Aggarwal et al., U of S Computer Science, RC 20620, Nov. 8, 1996.

*Tailored transmissions for efficient Near-Video-On-Demand service*\*, Yitzhak Birk et al.

*Reducing I/O Demand in Video-On-Demand Storage Servers*, Leana Golubchik et al., SIGMETRICS '95 Ottawa, Ontario, Canada.

*On Optimal Piggyback Merging Policies for Video-On-Demand Systems*, Charu Aggarwal et al., SIGMETRICS '96, May 1996 PA.

*Adaptive Piggybacking Schemes for Video-on-Demand Systems*, Charu C. Aggarwal et al., RC 20635 (Nov. 19, 1996) IBM Research Division.

*Merging video streams in a multimedia storage server: complexity and heuristics*, Siu-Wah Lau et al., Multimedia Systems (1998) 6:29-42.

*Patching: A Multicast Technique for True Video-on-Demand Services*, Kien A. Hua et al., ACM Multimedia 98—Electronic Proceedings.

*Improving Video-on-Demand Server Efficiency Through Stream Tapping*, Steven W. Carter, et al., Proc. Int'l Conf. On Computer Communication and Networks (ICCCN), Las Vegas, Sep. 1997, pp. 200-207.

*Stream Tapping: a System for Improving Efficiency on a Video-on-Demand Server*, Steven w. Carter et al., UCSC-CRL-97-11, Nov. 2, 1997.

\* cited by examiner

METHOD FOR REDUCED BANDWIDTH FOR ON-DEMAND DATA STREAMING USING MINI-CLUSTERS

CROSS-REFERENCE TO RELATED APPLICATIONS

This application is based on provisional application 60/147,569 filed Aug. 6, 1999 and claims the benefit thereof.

STATEMENT REGARDING FEDERALLY SPONSORED RESEARCH OR DEVELOPMENT

This invention was made with the United States government support awarded by the following agencies:
NSF 9975044
The United States has certain rights in this invention.

BACKGROUND OF THE INVENTION

The present invention relates to methods of transmitting "continuous media programs" such as video or audio files to multiple consumers at arbitrary starting times as selected by consumers within a delivery period. In particular, the present invention provides a method of reducing the bandwidth that must be reserved to transmit such data.

"Continuous media programs" present data that a consumer will normally process sequentially on a real-time basis. Examples of continuous media programs are video and audio programs, including movies, television shows, news clips, product advertisements, medical or recreational information or educational programs. This list of examples is not exhaustive.

"On-demand delivery" of a continuous media program is the delivery of the program beginning at a starting time occurring substantially at the time a consumer requests the program. For example, in a video-on-demand (VOD) system, a customer might be able to request viewing of a video program at a starting times every five minutes over the course of a several hour delivery period.

In order to reduce the costs of storage and distribution, continuous media programs may be multicast from a central server to a large number of consumers via phone lines, cable systems, broadcast radio, satellite links or other methods. For popular programs, many new requests will arrive at the central server during a delivery period. In response to these requests, the server may make a separate transmission of data to each consumer. This approach is simple and works with standard receiving devices (e.g., television sets) but has the disadvantage of requiring a large number of transmission channels, one for each starting time where a request has been received. For this simple scheme, the bandwidth (e.g., number of channels) required to serve requests increases linearly with the number of starting times required and thus does not scale well to large numbers of starting times where requests will be received.

One method of reducing the bandwidth required for supporting on-demand transmissions of continuous media programs divides the program into a number of segments each assigned to a different channel, for example, a conventional cable channel (using frequency multiplexing) or a logical channel such as may be achieved using different Internet addresses or the like. The segments are of increasing length and each segment is transmitted repetitively on its channel. Thus, for example, a first channel may repeatedly transmit a segment consisting of the first one minute of the program while a second, third, and fourth channel may repeatedly transmit minutes two and three, four and five, and six through nine, respectively.

Under this system, a consumer wishing to receive a program waits until the next starting time upon which, the consumer's receiver connects to the first channel to receive and play the first minute of program from that channel. At the end of the first minute, the receiver automatically switches to the second channel and so forth.

In the case where two channels do not begin and end to permit a clean switchover, for example, if the first and second channels begin their segments at the same time, the receiver records (buffers) the data of the later channel to be played back when the earlier channel is completed. Using properly arranged and sized segments, the receiver can switch channels to assemble different segments of the program into a continuous program thread that may be viewed without interruption by the consumer. This method is termed "skyscrapering" referring generally to how the segments of the program thread, when stacked like blocks from smallest to largest, resemble the profile of a skyscraper.

As can be seen from this simple example, four channels are sufficient to transmit a nine-minute program starting every minute. If separate broadcasts (and channels) were required for each new start time, nine channels would be needed. Skyscrapering thus reduces the bandwidth required for regular transmissions without loss of fidelity or other distortions of the program.

When multiple programs must be delivered, a variation on the skyscrapering system termed "dynamic skyscrapering" may be used to provide even greater transmission efficiencies. Dynamic skyscrapering recognizes that the segments distributed among different channels for a given program may be organized into clusters linking all segments on all channels that may form a complete program thread with a given segment of the final channel of the program. The boundary of a cluster exhibits the general merging that occurs in skyscrapering where many initial multicasts of data at starting times ultimately merge to a single stream represented by the final segment in the final channel of the transmission.

A significance of clusters is that once a first segment in a first channel of a cluster is requested, later requests for start times within the cluster do not require additional delivery of the final segment. Thus each cluster represents a single complete showing of the continuous media program and the next cluster represents a new showing.

Dynamic skyscrapering recognizes that at the interface between clusters, program material may be readily changed and exploits this fact when multiple programs are being transmitted, by sharing uncommitted clusters between programs. Specifically, a number of channels are collected into channel blocks each dedicated to a continuous media program. The clusters in the different blocks may be staggered in starting times. As requests for particular programs come in, they are assigned on a first-come, first-serve basis, first to any existing cluster currently transmitting the desired program and, if there are none, to any available cluster that has not previously been assigned. In this way, clusters not used for a given program because of lack of requests during the cluster time can be reassigned to another program. The staggering maximizes the availability of unassigned clusters and reduces the average waiting time when clusters are not available.

Early segments of a cluster that has already been assigned to a program may be shared with programs of different blocks ("channel stealing") to shorten the waiting time for a given program. However, extensive sharing of individual segments is not possible because merging causes conflicts at later segments in the cluster allocated to previous and later program threads.

BRIEF SUMMARY OF THE INVENTION

The present inventors have recognized that if the channels delivering a program are divided into leading and trailing groups, then the cluster of the leading group may be further divided into mini-clusters, each of which may be independently allocated to different channel blocks. By decoupling the allocation of mini-clusters of the leading groups with trailing clusters of the trailing group, the trailing clusters of the trailing group may be favorably repositioned so as to increase their ability to serve a greater number of requests. Further, by buffering between the leading group and the trailing group, the "catch-up window" of request times that may be served by a trailing cluster may be substantially increased. This allows greater freedom to share mini-clusters between channel blocks. The smaller granularity of the mini-clusters allows much more efficient sharing of bandwidth between the different channel blocks and, if the channel blocks are staggered to be finer than the resolution of the first segments, allows even faster response times to requests.

Specifically, the present invention is applicable to methods for transmitting continuous media programs over a number of channels to multiple consumers where each continuous media program is divided into a set of segments that may be repeatedly transmitted on separate channels and whereby segments from each channel may be assembled into a program thread including all the segments of the continuous media program. The transmission times on the channels may be collected into clusters that hold segments that may form a program thread with a given final segment of the channels.

In the invention, the channels are divided into a leading and trailing group, and within the leading group, clusters are divided into at least two mini-clusters that may hold segments forming a program thread with different final segments of the leading group. Upon receiving a given request for the continuous media program, less than all the mini-clusters of a cluster of the leading group are allocated to that request.

Thus it is one object of the invention to allow clusters to be more finally allocated by treating leading group channels and trailing group channels separately. Finer allocation (in mini-clusters) provides more efficient sharing of channel capacity between different programs.

When no previously allocated cluster in the trailing group would include the mini-cluster assigned to the request, the latest possible cluster in the trailing group that would include the mini-cluster is allocated.

Thus it is another object of the invention, by separating the allocation of leading and trailing group clusters, to allocate the trailing group clusters in a way that maximizes their potential to be connected with mini-clusters allocated in the future.

The method may include the step of allocating the cluster in the trailing group to a continuous media program, the cluster having at least one given initial trailing group segment. A second request may then be received for the same continuous media program prior to transmission of the given initial trailing group segment, but after conclusion of the transmission of a final initial segment of the cluster in the leading group. In this case, a mini-cluster of the second cluster is allocated in the leading group for the second request and transmission of the initial trailing group segment is buffered for use in creating a program thread with the segments of the second mini-cluster.

It is thus another object of the invention, by providing buffering between the clusters of the initial group and the trailing group, to expand the catch-up window defining which mini-clusters in the leading group can be merged with clusters in the trailing group. Increasing this catch-up window minimizes the necessary allocation of clusters in the trailing group for a given program.

The segments transmitted on the leading group channel and the trailing group channels need not be stored at the same device. The trailing group may be stored at a first location and the leading group stored at a second location where the first location is further from the consumers than the second location and the buffering may be performed at the second location. Alternatively, the consumer may perform the buffering.

Thus it is another object of the invention to provide the above benefits to systems where channels may be separated between remote and local servers. The buffering that frees the leading and trailing group allocation also reduces the need for strict time alignment between the two locations such as may facilitate their spatial separation.

The present invention may work with a set of continuous media programs transmitted over blocks of channels to multiple consumers. In each channel block, the channels are divided into leading and trailing groups and the clusters of the leading group are divided into mini-clusters as before. Upon receiving the given requests for the continuous media program, a mini-cluster of an available cluster from among the channel blocks of the leading group may be allocated to that request. Typically, if a cluster of the trailing group is already allocated to the continuous media program, another mini-cluster within the cluster including the allocated cluster of the trailing group will be selected, but need not be the case.

Thus is another object of the invention to use the present invention to improve the delivery of multiple programs.

The foregoing objects and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE INVENTION

The example of video-on-demand will be described, it being understood that the invention applies also to other types of streaming data. Further, the invention will be described with respect to a remote and local server coordinating to deliver the video data, however, the invention is also beneficial for single server applications.

Figure 1:
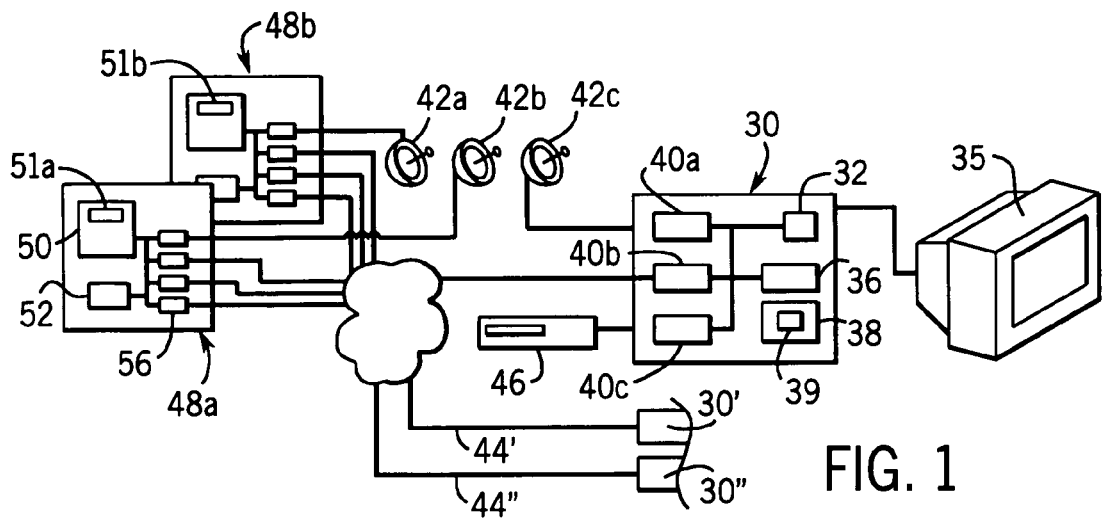
FIG. 1 is a block diagram of a multicast transmission system and receiving systems suitable for practice of the present invention showing connections of a remote and local server through a variety of links to each other and to a representative one of multiple consumers.

Referring now to FIG. 1, a consumer receiver 30, such as a set-top box at a consumer's home, connects via an output port 32 with a television monitor 35 through which a consumer may view streamed video data.

Output port 32 receives data by an internal bus 34 from a processor 36 that may execute a stored receiver program 39 (as will be described below) contained in memory 38 also connected to the internal bus 34. The internal bus 34 also connects to one or more input/output ("I/O") ports 40a through 40c which may provide for the receipt of streaming data. I/O port 40a through 40c may be connected, for example, singly or multiply to any of a variety of transmission media 41 including satellite antenna 42a–c, ground line 44 such as telephone line or cable, or to a fixed media player 46, any of which may provide for one or more data streams.

A local server 48a holds a portion 51a of a video program in memory 50 which will be formatted into data streams according to the present invention by processor 52 executing a stored server program 53 (described below) also stored in memory 50. The processor 52 and memory 50 communicate with each other over an internal bus 54 and also with multiple I/O ports 56 which may communicate via the previously described transmission media 41 and devices to multiple receivers 30, 30' and 30".

The particular communication protocols between the local server 48a and the receivers 30 are not critical provided they allow for broadcasting or multicasting in multiple logical channels (which may but need not be physical channels). Channels in this context refers generally to units of bandwidth and may be bandwidth on the Internet, satellite, cable or similar system.

Local server 48a may be connected with remote server 48b of identical design holding in memory 51b other portions of the video program and communicating them either to server 48a or directly to consumer receiver 30 as will be described.

The invention makes use in part of a prior art formatting technique termed "dynamic skyscrapering" described in a paper by the present inventors entitled *Dynamic Skyscraper Broadcast for Video-On-Demand*, presented at the Fourth International Workshop on Multimedia Information Systems (MIS'98), Istanbul, Turkey, September 1998, by Derek L. Eager and Mary K. Vernon.

Figure 2:
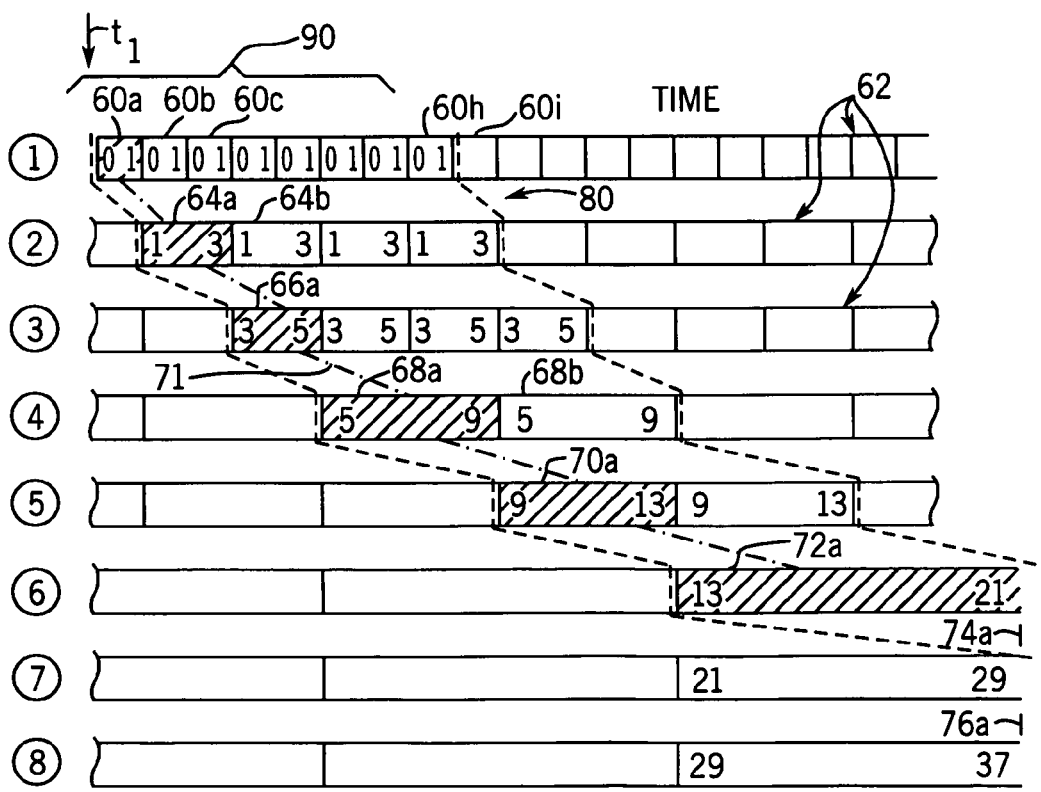
FIG. 2 is a graphical representation of a prior art skyscraper delivery system showing different channels on the vertical axis and time on the horizontal axis and further showing the breaking up of a continuous media program into multiple segments distributed over different channels which may assembled into program threads to recreate the entire continuous media program, each program thread lying within a given cluster.

Referring to FIG. 2, in this technique, a video program is broken into a variety of segments 60, 64, 66, 68, 70, 72, 74, and 76 of progressively greater length. A variety of different sequences of segments may be used but, in the present example, the sequence of relative sizes is [1,2,2,4,4,8,8,8], that is segments 64 and 66 are twice as long as segment 60, segments 68 and 70 are four times as long as segment 60 and so forth.

Each segment is repeatedly broadcast on a different channel 62. Thus, the first segment 60 is repeatedly broadcast on a first channel 62 and spans, for example, the first minute of video data from start to minute one as indicated. At the conclusion of the broadcast of one segment 60a, it is repeated or another segment of similar size broadcast in its place (as segments 60b, 60c and so forth).

The second segment 64a comprising the next two minutes of broadcast video (i.e., from minutes one to three) is broadcast on a second channel 62. This segment 64 is also repeated (as segments 64b, 64c, and so forth) with the boundaries between segments 64 aligned with every other boundary between segments 60. The third segment 66a may hold minutes three to five, and is repeated (as segments 66b, 66c, and so forth) on channel three with segments 66 aligned with segment 64.

The fourth channel may be used to broadcast segment 68a holding minutes five through nine repeated (as segments 68b, 68c, and so forth) with boundaries between segments 68 aligned with every other boundary between segments 66 (and 64). The fifth channel broadcasts segment 70a holding minutes nine through thirteen repeated (as segments 70b, 704c, and so forth) with boundaries between segments 70 aligned with segments 68.

Channels five, six and seven provide, respectively, minutes thirteen through twenty-one, via segments 72, minutes twenty-one through twenty nine, via segments 74, and minutes twenty-nine through thirty-seven, via segments 76. The boundaries of each of these latter equal-sized segments are aligned with each other and with every other boundary between segments 68 of channel four.

Referring also to FIG. 1, a consumer requesting to view the program of the segments 60, 64, 66, 68, 70, 72, 74, and 76 at a time $t_1$ waits briefly for the beginning of segment 60a and begins playing the content of segment 60 on the television monitor 35 (shown in FIG. 1) as received from channel zero. At the conclusion of that segment 60a, the receiver 30 is programmed to switch to channel one to begin playing segment 64a. At conclusion of segment 64a, the receiver 30 switches to channel two and begins playing segment 66a. This process of switching channels is repeated to play segment 68a, 70a, 72a, 74a, and 76a and thus to play the entire program. The segments 60a, 64a, 66a, 68a, 70a, 72a, 74a and 76a make up a program thread 71 (indicated also by shading) which complete without gap a transmission of the program.

A similar program thread (not shaded) may be constructed starting at segment 60b. In this case, as segment 60b is played by the receiver 30, segment 64a is recorded or buffered into the receiver's memory 38. The buffering process then merges with the program thread 71 to follow the same sequence of segments as previously described recording segments 66*a*, 68*a*, 70*a*, 72*a*, 74*a* and 76*a*, while the receiver 30 plays the video shortly behind its recording into memory 38.

The buffering allows different initial segments 60*a* through 60*h* to all serve requests from a consumer, and thus provide on-demand reception of the video program, and yet all to eventually merge with the final segment 76*a* for reduced bandwidth delivery. At most, only one channel must be buffered for any program thread.

As all program threads eventually merge at segments 76, a cluster 80 (bounded by dashed lines and only partially shown in FIG. 2) may be defined as the collection of all segments 60, 64, 66, 68, 70, 72, and 74 having one of segments 72 in common. As a general rule, once an individual first segment 60*a* of a cluster 80 is allocated, except for minor channel stealing as described above, the remaining segments 64, 66, 68, 70, 72 must be reserved for the given program because the threads of other segments of the cluster eventually merge. Nevertheless, a first segment 60*i* outside of the cluster 80 may be allocated to a different program as it will eventually merge to a different final segment 76.

Each cluster exhibits a catch-up window 90 equal generally to the time width of the segments 60*a* through 68 forming the top segment layer of the cluster 80. For a request to be serviced by a cluster, it must arrive at a time from the first segment 60*a* to immediately prior to the last segment 60*h*.

Figure 3:
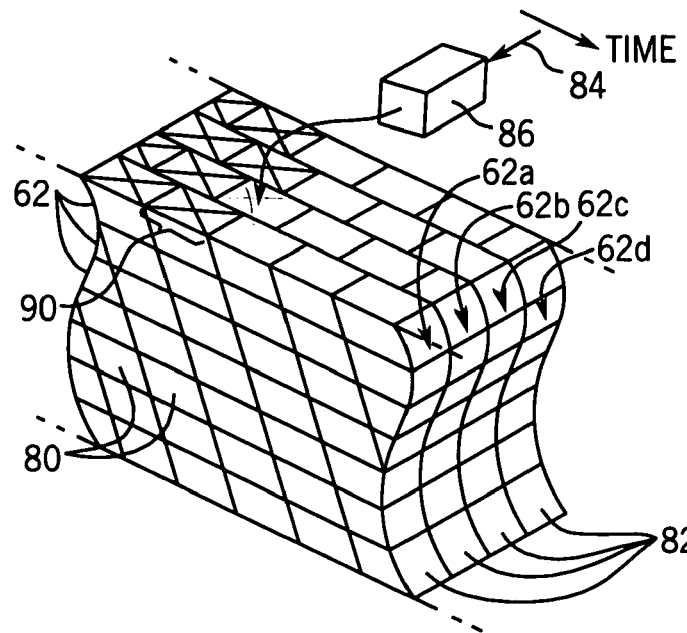
FIG. 3 is a three-dimensional perspective view of implementation of the skyscraper delivery system of FIG. 2 for multiple channel blocks, each which may hold a different program showing a persistent staggering of the clusters of the channel blocks to facilitate the allocation of new requests to clusters on a real-time basis.

Referring now to FIG. 3, different sets of channels 62*a*, 62*b*, 62*c*, and 62*d* may be arranged in channel blocks 82 with a staggering in time of their respective clusters 80. As a given request 84 is received, an allocation routine 86 (implemented by the servers 48*a* or 48*b*) may review clusters 80 in any of the channel blocks 82 whose catch-up windows 90 embrace the request time.

If the request is for a program not currently allocated to a cluster 80, the next free cluster 80 is allocated to that request. Clusters 80 assigned to a program are indicated by X's spanning the catch-up window 90 on the upper face of the clusters 80. Otherwise the request is allocated to the existing cluster serving that program.

Figure 4:
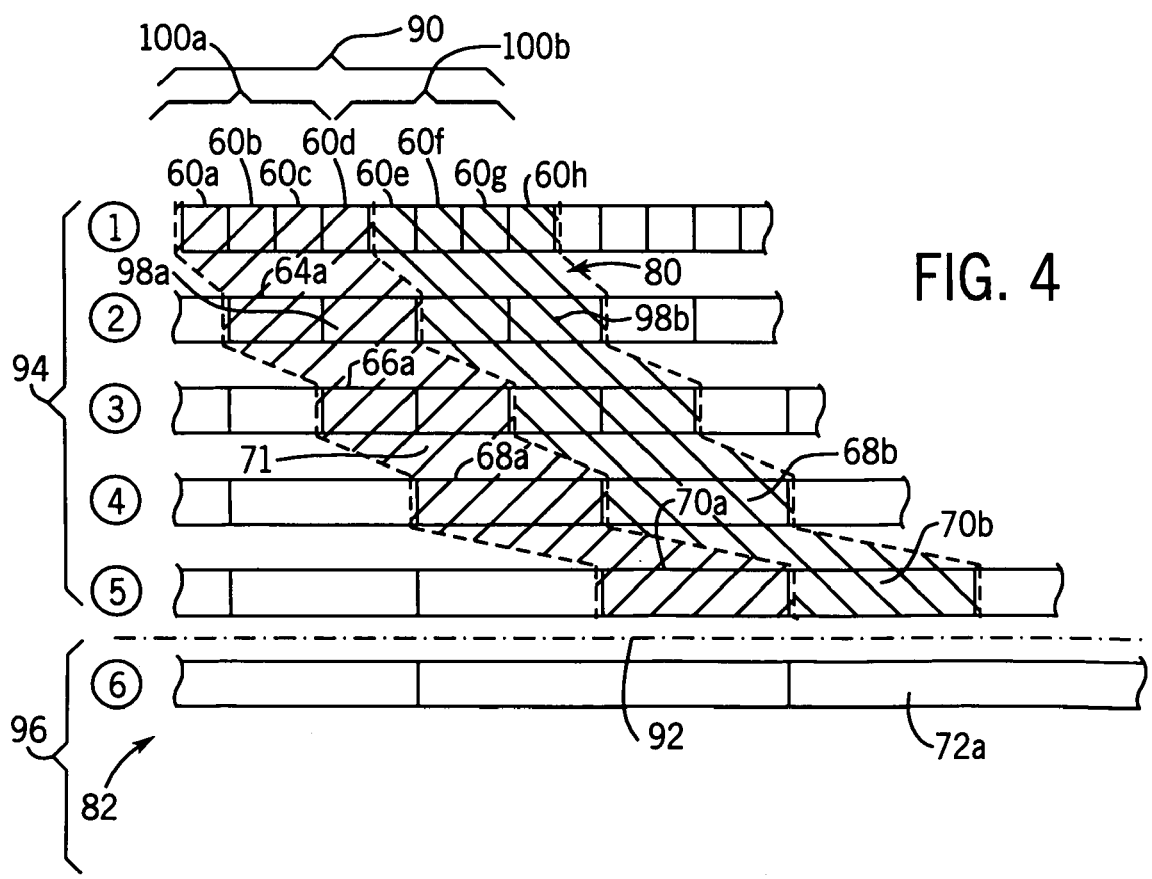
FIG. 4 is a detailed view of the channel system of FIG. 2, showing division of the channels into leading and trailing groups and the resulting possible partitioning of the cluster of the leading group into mini-clusters, each of which may be separately allocated.

Referring now to FIG. 4, the present inventors have recognized that an arbitrary channel group interface 92 may be established between channels used in a given channel block 82. The channel group interface 92 divides the channels into a leading group 94 (in this example, channels one through five), and a trailing group 96 of channels six through eight.

The leading and trailing groups 94 and 96 may be treated independently ("decoupled") with respect to allocation to program requests 84. The decoupling allows varying degrees of shifting of the boundaries between the segments across the channel interface (e.g., segments 70 and 72). The shifting may be the width of a final segment of the leading group 94, or by a non-integral amount less than or greater than this final segment of the leading group 94 made possible by an additional level of buffering as will be described.

After division of the channels 62 into the leading group 94 and the trailing group 96, the cluster 80 within the leading group 94 may be broken into mini-clusters, in this example mini-clusters 98*a*, and 98*b* that are wholly non-overlapping (i.e., do not merge to a common segment) within the leading group 94 and thus that may be allocated separately. The segments making up mini-clusters 98*a*, and 98*b* are shown within cluster 80 by different cross-hatching.

Mini-cluster 98*a* provides a reduced catch-up window 100*a* of segments 60*a*, 60*b*, 60*c* and 60*d*. Any program threads starting with these segments culminates in segment 70*a*.

Conversely, mini-cluster 98*b* provides a reduced catch-up window 100*b* of segments 60*e*, 60*f*, 60*g* and 60*h*. Any program threads starting with these segments culminates in segment 70*b* of the leading group 94. Typically a cluster 80 of the leading group 94 may include many mini-clusters 98 as a function of the number of channels 62 in the leading group 94 and is not limited to two.

Figure 5:
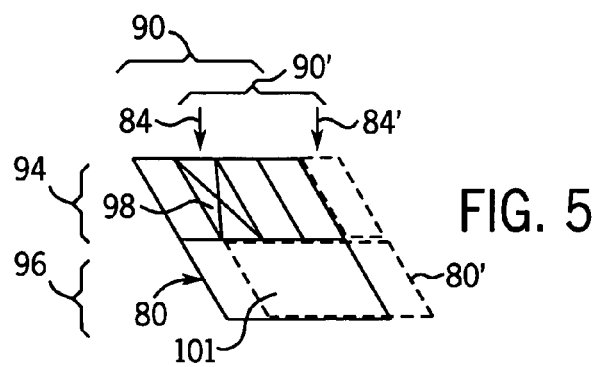
FIG. 5 is a simplified diagram of a cluster of FIG. 4 showing a benefit of separately allocating trailing group clusters after allocation of a mini-cluster for maximum future catch-up window for the trailing group cluster.

Referring now to FIG. 5, a request 84 may arrive during a cluster 80 and in particular at a mini-cluster 98 being, in this example, a second mini-cluster of cluster 80 which includes four mini-clusters 98. It is presumed that the first mini-cluster of the cluster 80 was not allocated to a program as a result of now request 84 occurring within its reduced catch-up window 100. In the prior art, cluster 80 of the leading group 94 must align with cluster 80 of the trailing group 96. Following the prior art system, then, allocation of the second mini-cluster 98 of the cluster 80 of the leading group would require allocation of the entire cluster 80 of the trailing group 96 to the same program.

With the decoupling of the present invention along channel group interface 92, the portion of the cluster 80, in the trailing group 96 may be separately scheduled so as to be shifted to a later time shown as cluster 80' and dotted lines. The result of this shifting is to move the allocated mini-cluster 98 to be the first mini-cluster 98 with respect to the cluster 80'.

By delaying or independently scheduling of the cluster 80' of the trailing group 96, the likelihood that a subsequent request 84 for the same program can be served by the cluster 80' of the trailing group 96 is increased. That is the catch-up window 90 is shifted right to catch-up window 90' raising the possibility of servicing a request 84' without allocating a new cluster 80' in the trailing group 96. Scheduling the clusters of the leading group 94 and trailing group 96 separately thus provides the potential for decreased new cluster usage and thus a decrease in bandwidth. The ability to serve two requests with the same cluster leaves another cluster open for other uses.

The size of the mini-clusters can be reduced to the width of a single segment 60 of the first channel 62 with efficient allocation of bandwidth by adoption of the sequence of relative sizes for segments of [1,1,2,2,j,j,k,k . . . ] in which the leading group is only the first two channels. In this way a new mini-cluster 98 having a width of one can be allocated to each new request.

Figure 7:
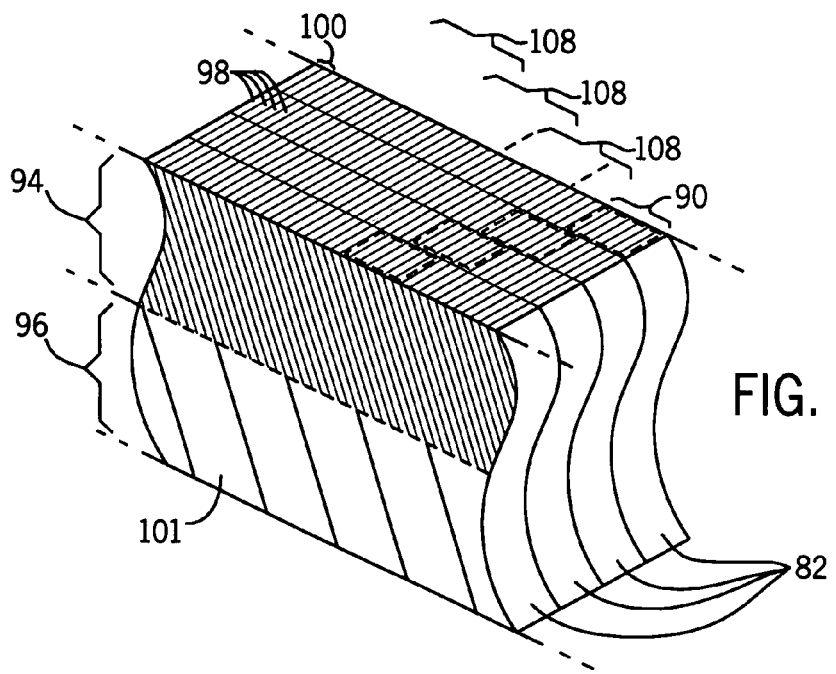
FIG. 7 is a figure similar to that of FIG. 3 showing the improved allocation of new requests between channel blocks.

Referring now to FIG. 7, the availability of mini-clusters 98 and their many reduced catch-up windows 100 allows a much finer allocation scheme in which entire clusters 80 (shown in dotted outline) need not be allocated to a given program but only individual mini-clusters 98 which may be connected to an independently scheduled trailing group cluster 101 in the same or different channel blocks 82. An effective delayed scheduling of the trailing clusters 101 from cluster 80 to clusters 80' per the example of FIG. 5 may be accomplished in certain instances by moving between the channel blocks 82 and taking advantage of their persistent staggering.

Whereas before, a single request falling into a catch-up window 90 of a cluster dedicates the entire cluster 80 to that request, precluding its use for later requests of a different program with mini-clusters 98, several different programs may be allocated to different mini-clusters 98 within one cluster provided they are within a catch-up window 90 of at least one cluster 80 in the trailing group 96.

Figure 6A:
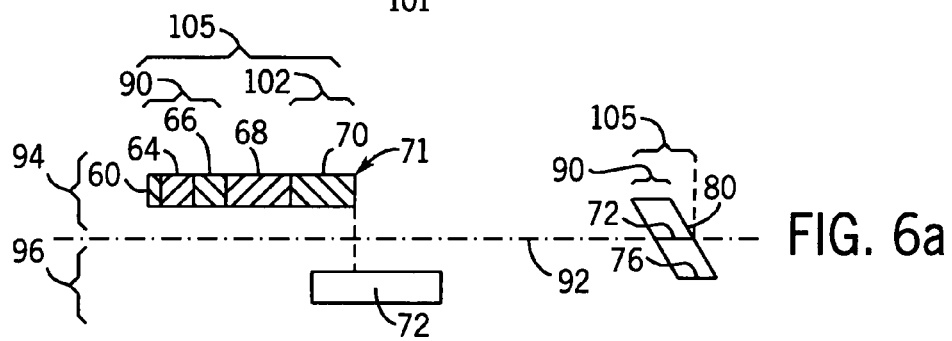
FIG. 6a is a graphical representation of a catch-up window for a conventional skyscraper delivery having a parallelogram cluster shown to the right.

Referring now to FIG. 6a, the ability to freely allocate mini-clusters 98 requires that they eventually align with a leading segment (e.g., segment 72 in the example of FIG. 4) of a cluster 80 of the trailing group 96 transmitting the desired program. Note that generally the leading segment of the trailing group may be repeated in a single trailing group cluster. A program thread 71 of the leading group 94 composed of segments 60, 64, 66, 68, 70 extends over a time 105 and must have overlap in its final segment 70 with the initial segment 72 of a cluster 80 with a corresponding program in the trailing group 96.

Thus the catch-up window 90 (defining the earliest and latest time a request for that program may be received) is identical in size 102 to the last segment 70 of the leading group 94. As can be seen from the simplified depiction of the cluster of the leading and trailing groups 94 and 96, the cluster forms a parallelogram with equal length bases thus constraining the catch-up window to be no greater than the length of the final segment 76 of the cluster 80.

Figure 6B:
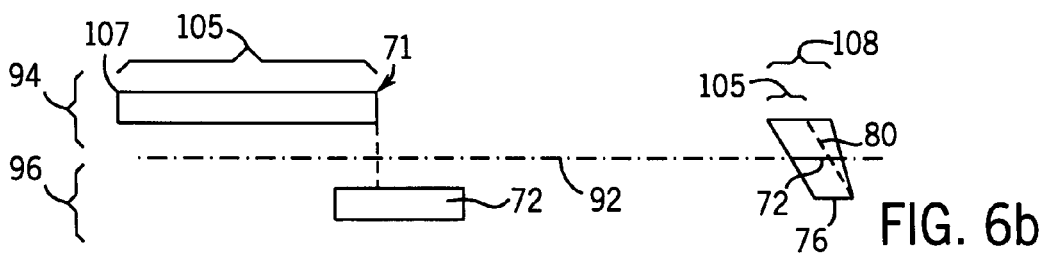
FIG. 6b is a figure similar to that of FIG. 6a showing a wider catch-up window provided by buffering in the present invention having an irregular trapezoidal cluster shown on the right.

By introducing the capability of buffering between the leading groups 94 and trailing group 96, this catch-up window 90 may be extended to the time 105 as shown in FIG. 6b requiring only that there be overlap between the program thread 71 and the initial segment 72 of the trailing group 96 with which it will merge. This is possible because so long as the initiation time 107 of the program thread begins prior to the initiation time of the segment 72 and yet not so early that there is a gap between the end of the program thread 71 and the beginning of segment 72 which would cause a break in the transmitted material, the segment 72 may be buffered or stored temporarily in memory until conclusion of the program thread 71.

As shown in the right side of FIG. 6b, the cluster 80 now forms a trapezoid with the expanded catch-up window 108 equal to upper base time 105 and greater than the final segment 76 of the cluster.

While such this buffering requires that up to two channels may need to be simultaneously buffered while a third channel is played, a buffering between the channels of the leading group 94 and trailing group 96 need not be performed by the set top box but may be performed internally to the server 48a, for example.

Referring to FIG. 7, by providing an expanded catch-up window 108, greater flexibility in allocating different programs to mini-clusters 98 may be had. Each reduced catch-up window 100 for a mini-cluster 98 can be allocated to any program for which an ongoing cluster 80 of any channel block 82 has an expanded catch-up window 108 that overlaps with the request time of the mini-cluster 98. The expanded catch-up windows 108 (which may overlap among channel blocks 82) provide many more possible allocations for mini-clusters without committing a new cluster to the requested program. Of course, if no allocated cluster exists for the request, a mini-cluster of an unallocated cluster 80 may be allocated to the request.

By decoupling the clusters of the trailing group 96 which define ultimately programs that can be initialized by the mini-clusters from the mini-clusters of the leading group 94, mini-clusters 98 may bind not only to clusters in their channel block 82, but more easily to clusters in other channel blocks as a result of the lack of need for precision alignments between the mini-clusters and their supporting clusters of the trailing group 96. Thus, far more efficient allocation may be provided both by requiring less bandwidth to be allocated to each request and allowing more flexible teaming of requests with ongoing clusters.

Breaking the channels into a leading group 94 and a trailing group 96 allows the storage burden of the channels to be divided among a local server 48a and a remote server 48b per the channel group interface 92. The leading group channels will be allocated to the local server 48a, as will be described in a co-pending application, and the channels of the trailing group 96 will be allocated to the remote server to reduce transmission cost. The remote server 48 will be further away from the consumer in terms of transmission costs than the local server 48. Buffering between the leading group channels and trailing group channels can facilitate the switchover between these two servers by relaxing the need for precise alignments between segments.

It should be noted that when a group of channels 62 (providing either mini-clusters 98 or trailing group clusters 101) is idle, that is, not allocated to a request or program, and a new request comes in, the mini-cluster 98 or training group cluster 101 can be scheduled asynchronously, that is, at starting times that are not constrained to the regular periodic starting times as depicted.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. In a method of transmitting continuous media programs over a number of channels to multiple consumers, wherein the continuous media program is divided into a set of different segments that may be repeatedly transmitted on separate channels whereby segments from each channel may be assembled into a program thread, the improvement comprising the steps of:

(a) dividing the channels into a leading and trailing group;

(b) within the leading group, creating a first and second mini-cluster, each mini-cluster initially configured to merge with a common trailing group segment, each mini-cluster holding segments forming a program thread with different final segments of the leading group; and (c) independently allocating at least the first mini-cluster of the leading group for transmission of the continuous media program in response to one or more program requests; and (d) determining a characteristic of the one or more program requests and depending on the characteristic of the one or more program requests, mapping the first and second mini-clusters into the common trailing group segment or mapping the first and second mini-clusters into different trailing group segments;

whereby channel bandwidth may be more efficiently allocated.

2. The method of claim 1, including the further step of:

(e) when no previously allocated segment in the trailing group would include a select one or more of the mini-cluster allocated in step (c), allocating a latest possible segment in the trailing group that would include the select one or more mini-clusters allocated in step (c).

3. The method of claim 1 including the further step of:

(e) allocating at least one transmission of a given initial trailing group segment; and (f) buffering the transmission of the given initial trailing group segment for use in creating a program thread with the segments of the second mini-cluster;

whereby a larger range of leading group initial segments may form program threads with the given initial trailing group segments.

4. The method of claim 3 wherein at step (c) when no previously allocated trailing segment of the trailing group will provide a program thread for the request, allocating a latest possible trailing segment that would provide a program thread for the request.

5. The method of claim 3 wherein the buffering of step (f) is performed by the consumer.

6. The method of claim 3 wherein the trailing group is stored at a first location and the leading group is stored at a second location wherein the first location is further from the consumer than the second location and wherein the buffering of step (f) is performed by the second location.

7. The method of claim 1 wherein the trailing group is stored at a first location and the leading group is stored at a second location wherein the first location is further from the consumer than the second location.

8. The method of claim 1 wherein the continuous media programs are selected from the group consisting of: music, movies, television shows, news clips, product advertisements, medical information, recreational information and educational programs.

9. The method as recited in claim 1, wherein the segments on each channel within the mini-clusters are substantially contiguous.

10. In a method of transmitting continuous media programs over a number of channels to multiple consumers, wherein the continuous media program is divided into a set of different segments that may be repeatedly transmitted on separate channels whereby segments from each channel may be assembled into a program thread, the improvement comprising the steps of:
 (a) dividing the channels into a leading and trailing group;
 (b) within the leading group, creating a first and second mini-cluster, each mini-cluster initially configured to merge with a common trailing group segment, each mini-cluster holding segments forming a program thread with different final segments of the leading group; and
 (c) independently allocating at least the first mini-cluster of the leading group for transmission of the continuous media program in response to one or more program requests; and
 (d) depending on a characteristic of the one or more program requests, mapping the first and second mini-clusters into the common trailing group segment or mapping the first and second mini-clusters into different trailing group segments, wherein the trailing group segment for the second mini-cluster is time-shifted relative to the trailing group segment for the first mini-cluster;

whereby channel bandwidth may be more efficiently allocated.

11. The method as recited in claim 1, wherein the characteristic is an identification of the requested media program.

* * * * *